United States Patent [19]

Beckrich

[11] Patent Number: 5,365,630
[45] Date of Patent: Nov. 22, 1994

[54] APPARATUS FOR CLEANING CONTACT LENSES

[76] Inventor: Mary B. Beckrich, 13601 N. 18th St., Phoenix, Ariz. 85022

[21] Appl. No.: 208,919

[22] Filed: Mar. 10, 1994

Related U.S. Application Data

[63] Continuation of Ser. No. 125,497, Sep. 22, 1993, abandoned, which is a continuation of Ser. No. 997,156, Dec. 11, 1992, abandoned, which is a continuation of Ser. No. 880,294, May 5, 1992, abandoned, which is a continuation of Ser. No. 678,731, Apr. 1, 1991, abandoned, which is a continuation-in-part of Ser. No. 305,195, Feb. 2, 1989, abandoned.

[51] Int. Cl.$^5$ .................. B08B 11/02; G02C 13/00
[52] U.S. Cl. .................. 15/104.92; 15/214
[58] Field of Search .............. 15/21.1, 97.1, 104.92, 15/210.1, 214

[56] References Cited

U.S. PATENT DOCUMENTS

| | | | |
|---|---|---|---|
| 3,150,406 | 9/1964 | Obitts | 15/214 X |
| 3,344,461 | 10/1967 | Floor | 15/214 X |
| 3,770,113 | 11/1973 | Thomas | 206/5 A |
| 4,187,574 | 2/1980 | Wrue | 15/104.92 |
| 4,187,868 | 2/1980 | Rudolphi | 134/184 |
| 4,228,136 | 10/1980 | Thomas | 422/307 |
| 4,546,517 | 10/1985 | Caniglia | 15/214 |
| 4,559,662 | 12/1985 | Kunold | 15/214 X |
| 4,721,124 | 1/1988 | Tuerkheimer et al. | 134/138 |
| 4,779,300 | 10/1988 | Pompe | 15/104.93 |

FOREIGN PATENT DOCUMENTS

| | | |
|---|---|---|
| 467822 | 9/1950 | Canada . |
| 3412558A | 10/1985 | Germany . |
| 3705196A | 9/1988 | Germany . |
| 1-118816A | 5/1989 | Japan . |
| 121818 | 5/1989 | Japan .................. 15/214 |
| 2124404A | 2/1984 | United Kingdom . |

OTHER PUBLICATIONS

The Sharper Image Catalog, Feb. 1990, front cover and p. 52 ("Two Minutes to Clean Contacts.")
Entertainment Weekly, Mar. 9, 1990, front cover and p. 74 ("Take Your Contacts For A Spin".
Jokon Automatic Contact Lense Cleaning Accessory, single sheet of directions for use, 1989.
Contact Lens Forum, Jan. 1988 pp. 76–77.

*Primary Examiner*—Chris K. Moore
*Attorney, Agent, or Firm*—Kinney & Lange

[57] ABSTRACT

An apparatus for cleaning contact lens includes a lens cleaning case having a base and a cover pivotally mounted to the base. The base is provided with two spaced-apart domed lower cleaning pad receptacles. A cleaning pad motion plate is provided with a pair of dished upper cleaning pad receptacles adapted to be concentrically aligned with the lower receptacles when the motion plate is situated between the lower receptacles and the top of the cover. Cleaning pads having cleaning surfaces and spaced-apart handling surfaces are installed on each of the receptacles so that the cleaning surfaces of the lower pads. A stanchion or boss extends upwardly from the motion plate through a provided hole in the cover. The cleaning pads are absorbent and are impregnated with a suitable cleaning fluid. Lenses to be cleaned are placed on the top of each of the lower cleaning pads, the upper cleaning pads are placed on top of the lenses and lower pads, and the cover is closed. The motion plate boss is manually moved in a figure of eight pattern to clean both lenses.

10 Claims, 5 Drawing Sheets

APPARATUS FOR CLEANING CONTACT LENSES

This is a continuation of application Ser. No. 08/125,497, filed Sep. 22, 1993, which is now abandoned; which is a continuation of application Ser. No. 07/997,156, filed Dec. 11, 1992, abandoned; which is a continuation of application Ser. No. 07/880,294, filed May 5, 1992, abandoned; which is a continuation of application Ser. No. 07/678,731, filed Apr. 1, 1991, abandoned; which is a continuation-in-part of application Ser. No. 07/305,195, filed Feb. 2, 1989, abandoned.

BACKGROUND OF THE INVENTION

1. Field of the Invention

This invention has relation to the cleaning of contact lenses with a minimum of contact between the lenses and fingers, lens cases, and other possible contaminants.

2. Description of the Prior Art

Contact lens wearers customarily clean their lenses by procedures which bring their fingers in contact with the lenses. Wearers are urged by purveyors of contact lenses to use either heat or chemical disinfection. Chemical disinfection is recommended over heat by some medical doctors because of the negatives in the heat method: shorter lens life, opportunity to overheat or underheat and the need for a power source. On the other hand, chemical disinfection is effective in low concentration and for a wide variety of organisms. It also needs no power source. See *Contact Lens Forum* for January 1988, page 76. Liquid surfactant cleaners are recommended for daily use to remove common lens deposits, including bound protein. Ibid, Back Cover. Enzymatic cleaners are recommended for use with surfactant cleaners although surveys show that 35% of soft contact lens wearers never clean with enzymatic cleaners, only 20% clean once a week, and 35% once every two weeks. About 60% of RGP wearers never use enzymes, 5% once a week and 15% once every two weeks. Ibid, page 76.

It is known to place contact lens on scrubbing pads and then to use the index finger on the lens to move the lens around. Ibid, page 46.

Regardless of the currently recommended procedures for the cleaning and other processing of contact lenses, it is believed by the inventor and those in privity with her to be common knowledge that most contact lens users place the lens to be cleaned in the palm, add several drops of cleaning solution to the palm, and then use the forefinger of the other hand on the lens to rub it around in the palm. Cleaning is completed by inverting the lens and using the finger to rub it around in the palm again. It is recommended that the lens then be picked up on a dome-ended stick and put into an effervescent enzymatic cleaning solution before being reinserted in the eye. Because of the inconvenience of using this stick, this step is often skipped.

What was needed before the present invention was a way of cleaning and otherwise processing contact lenses which eliminated transfer of organisms and materials from the human hand and elsewhere to the lenses during the cleaning process. The inventor and those in privity with her are not aware of any prior art which anticipates this invention and the claims made herein.

SUMMARY OF THE INVENTION

An apparatus for cleaning contact lenses includes a pair of cleaning pads for each lens to be cleaned. Each pad is partially defined by a pair of opposed, spaced-apart, roughly parallel, working surfaces, a first of such working surfaces being a cleaning surface and a second of such surfaces being a handling surface. Each pad is so constituted and constructed that its cleaning surface readily conforms to and comes into intimate contact with one of the opposed side surfaces of a contact lens to be cleaned when the pads are positioned with their cleaning surfaces in facing relation to each other with the lens to be cleaned therebetween, and when pressure toward the lens is applied to the opposed handling surfaces of the pads.

Pressure and movement means is provided to apply pressure to the handling surfaces of the pads in direction toward the lens and to apply relative lateral movement to the handling surfaces of the pads to move the pads laterally with respect to each other when the lens to be cleaned is positioned between the pads.

The cleaning surface portions of both pads are of materials which will not tend to abrade the lens being cleaned. The handling surface portions of each pad have a coefficient of friction with respect to that part of the pressure and moving means in contact with the handling surface portion compared to the coefficient of friction between the pad cleaning surfaces and the lens such that movement of the pads laterally with respect to each other will result primarily in movement of the cleaning surfaces of the pads over the opposed surfaces of the lenses.

In a preferred form of the invention, portions of the pads adjacent the cleaning surfaces are liquid absorbent.

In a preferred form of the invention, at least that portion of the handling surface of at least one of the pads which comes into contact with a portion of the pressure and movement means is covered with a releasable pressure sensitive adhesive to tend to prevent relative movement of that pad and the pressure and movement means.

A method of cleaning lenses includes the first step of positioning each lens to be cleaned between a pair of cleaning pads such as set out above. The lens is to be in contact with central portions of each pad.

A second step of the method is to apply pressure and movement means to central portions of the handling surfaces of each pad in approximate axial alignment with the center of the lens to be cleaned.

A third step is to cause the pressure and movement means to press the pads toward each other and to move the pads with respect to each other radially of the lens and in all directions; but for distances not greater than the largest radius of the lens being cleaned.

In a preferred method, the step of moving the pads with respect to each other in all directions includes moving one of the pads to have its central portion perform a figure of eight movement with respect to the central portion of the other pad In another preferred method, the cleaning surface portions of both pads are of materials which will not tend to abrade the lens being cleaned and portions of the pads adjacent the cleaning surfaces are liquid absorbent. Before the step of positioning the lens to be cleaned between a pair of such cleaning pads, the method includes a further step of impregnating the absorbent portion of the pads with an appropriate Lens cleaning liquid.

DETAILED DESCRIPTION OF THE PREFERRED EMBODIMENTS

Figure 1:
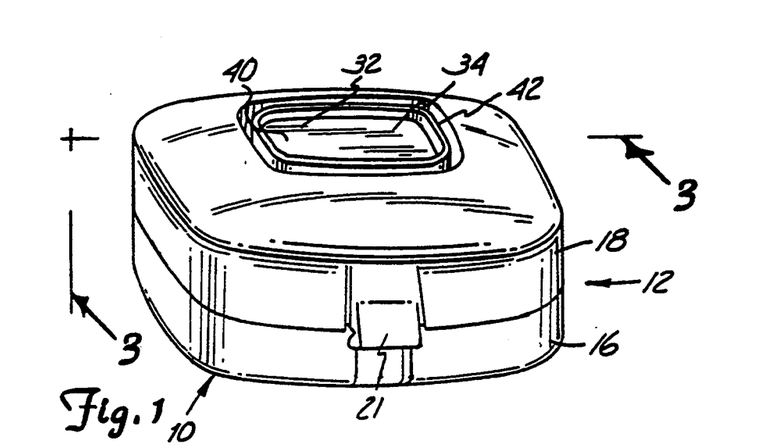
FIG. 1 is a perspective view of a lens cleaning case forming part of an apparatus for cleaning concave/convex contact lenses.

A lens cleaning case 10, as seen in FIG. 1, is part of an apparatus 12 for cleaning concave/convex contact lenses 14,14. The cleaning case includes a base 16 and a cover 18 pivotally mounted to the base 16 as at 20 in the form of the invention as shown. When the lens cleaning case 10 is in use, a resilient latch 21 on the cover holds the cover firmly to the base in the form of the invention as shown, and as best seen in FIG.

Figure 2:
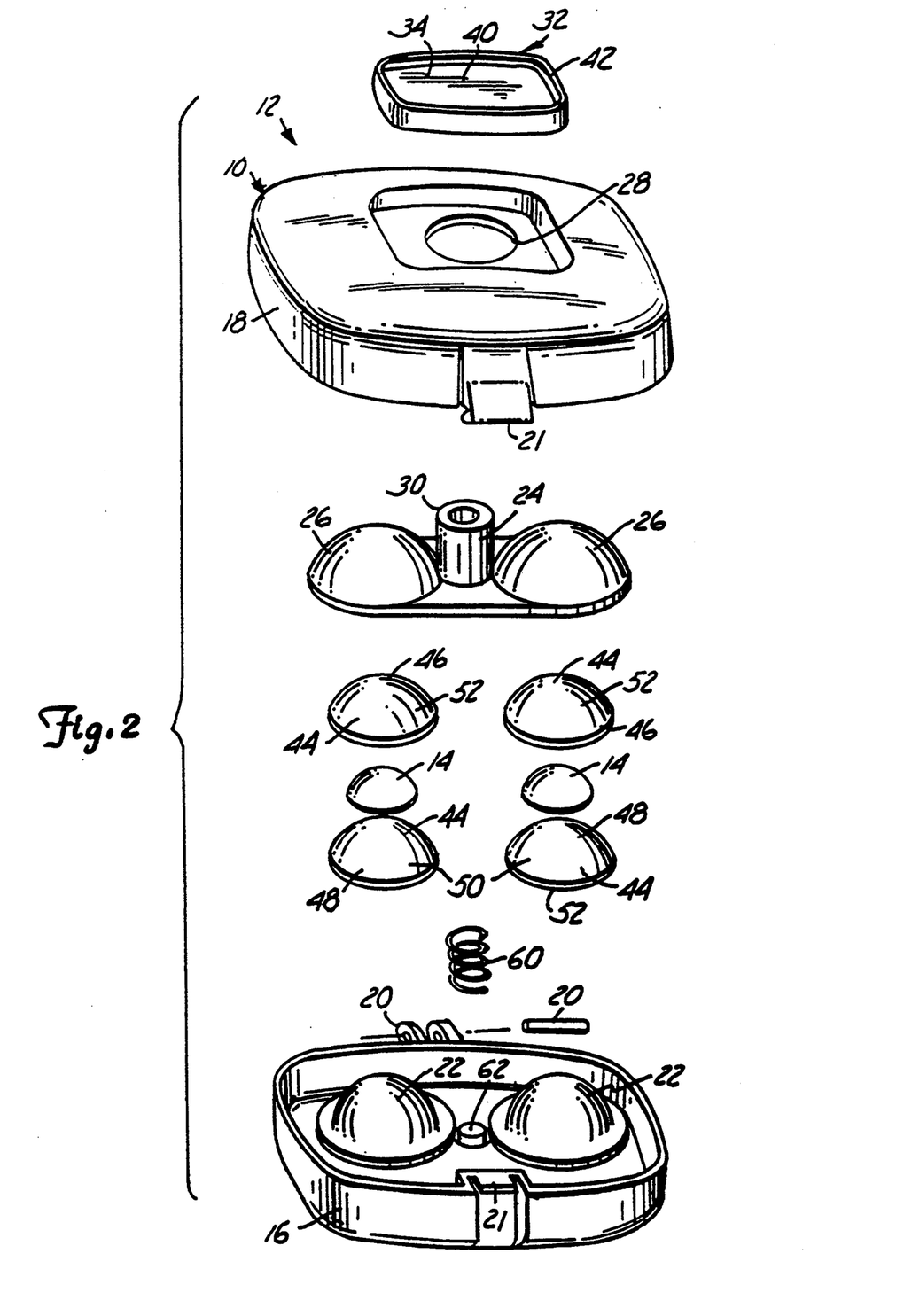
FIG. 2 is an exploded view of the apparatus of FIG. 2.

The base 16 is provided with a pair of rounded, convex or domed lower cleaning pad receptacles 22,22, in the form of the invention as shown. These receptacles 22,22 are fixedly positioned in the base in side by side coplanar relationship with respect to each other.

An upper cleaning pad motion plate 24 includes a pair of rounded, concave or dished, upper cleaning pad receptacles 26,26, in the form of the invention as shown. These upper cleaning pad receptacles 26,26 form an integral part of the upper cleaning pad motion plate 24 and are in side by side, coplanar relation to each other to be in approximately concentric relationship with respect to the lower cleaning pad receptacles 22,22 when the motion plate is installed inside of the cover 18.

The cover 18 is provided with a generally rectangular cleaning pad motion plate movement limiting opening 28, this opening having rounded corners.

Motion plate 24 includes a centrally positioned upwardly extending stanchion or boss 30 extending through the opening 28 in the cover 18.

The motion plate boss 30 is provided with an upper cap portion 32. In the form of the invention as shown, this cap portion is in the form of a generally rectangular cap 34 which is integrally adhered to or otherwise fastened to a cylindrical upper portion of the boss 30 as at 36 after the boss has been extended through the cover opening 28 to thus permanently associate the motion plate 24 with the cover 18. It is to be understood, however, that the motion plate 24 need not necessarily be permanently associated with the cover, and that the upper cap portion 32 need only be accessible to the person cleaning the lenses through the opening 28 for manual manipulation of the motion plate.

In the form of the invention as shown, the cap 34 of the upper cap portion 32 of motion plate 30 is provided with a finger receiving upper surface 40 and an upstanding rim 42 around that surface to assist in retaining the finger on the surface 40 for a purpose to be described.

A pair of upper, motion plate cleaning pads 46,46 are provided, each to be assembled with one of the pair of rounded, concave or dished, upper cleaning pad receptacles 26,26; and a pair of lower, base mounted cleaning pads 48,48, each to be assembled with one of the pair of rounded convex or domed, lower cleaning pad receptacles 22,22. Each of the pads 46,46 and 48,48 are partially defined by opposed, spaced-apart, roughly parallel, working surfaces 44,44. A first of these working surfaces of each pad is a cleaning surface 50, and a second of the surfaces is a handling surface 52. The cleaning surfaces 50 of upper pads 46,46 are on the bottom and the cleaning surfaces 50 of the pads 48,48 are on the top so that when the upper pads 46 are assembled to the upper cleaning pad receptacles 26 and the lower cleaning pads 48 are assembled to the lower cleaning pad receptacles 22, the cleaning surfaces 50 will be in facing relationship to each other.

Figure 5:
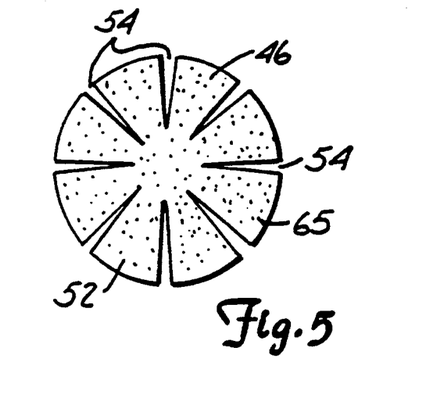
FIG. 5 is a top plan view of an upper motion plate cleaning pad made according to one form of the invention.
Figure 6:
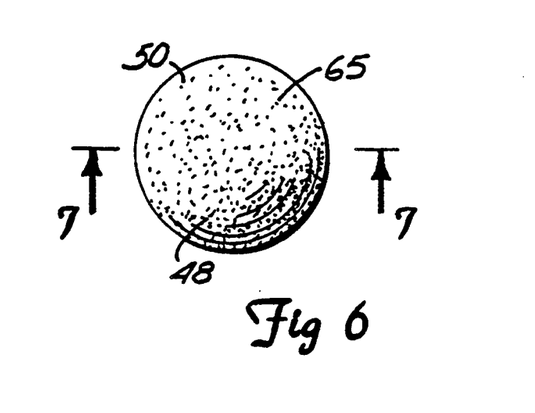
FIG. 6 is a top plan view of a lower, base mounted, cleaning pad made according to another form of the invention.

Before the cleaning pads are assembled to the pad receptacles, the pads can have different forms. For example, as shown in FIG. 5, either an upper or lower cleaning pad 46 or 48 can initially be stored flat with or with or without slots 54 therein. Where the cleaning pad 46 or 48 is fairly stiff, the presence of slots 54 can help insure that the pad will easily conform to the upper cleaning pad receptacles 26, for example. Where pads of softer materials are used, these slots may not be needed.

In using cleaning pads such as cleaning pad 46 shown in FIG. 5, in either the upper or lower cleaning pad receptacles, the pads may be put into assembled relationship with respect to their pad receptacles using a roughened handling surface 52 and a roughened interior surface of the cleaning pad receptacles 26 or 22; or an adhesive can be placed on the handling surface of the pad or into the receptacle to insure that the pads stay in place during the cleaning operation. Hook and eye fasteners, cylindrical ridges or rims built into the periphery of the cleaning pad receptacles, or any other usual or preferred means of maintaining the pads in place during cleaning can be used.

Figure 7:
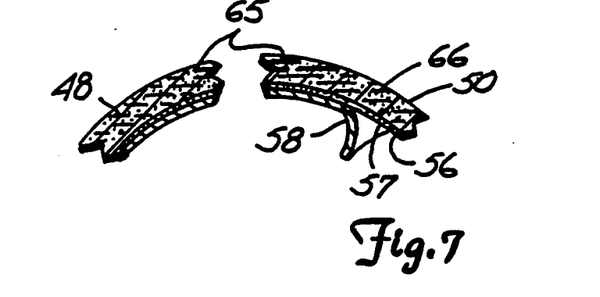
FIG. 7 is an enlarged vertical sectional view taken on the line 7—7 in FIG. 6.

For example, the pads can initially have an at least slightly domed or dished contour such as seen in FIGS. 2, 3, 4, 6 and 7. This will lessen the problem in maintaining the pads in position in the pad receptacles during the cleaning operation. A further, and preferred, means of maintaining the pads in position is illustrated best in FIG. 7 wherein the handling surface 52 of the pad 48 is covered with a fluid impervious substrate 56, and this substrate can carry a releasable pressure sensitive adhesive 57 thereon. While these pads are being stored before they are used, a removable protective skin 58 will cover the adhesive 57 on the substrate 56. In FIG. 7, this skin 58 is shown in the process of being removed from handling surface of the cleaning pad preparatory to use in cleaning a contact lens.

Figure 3:
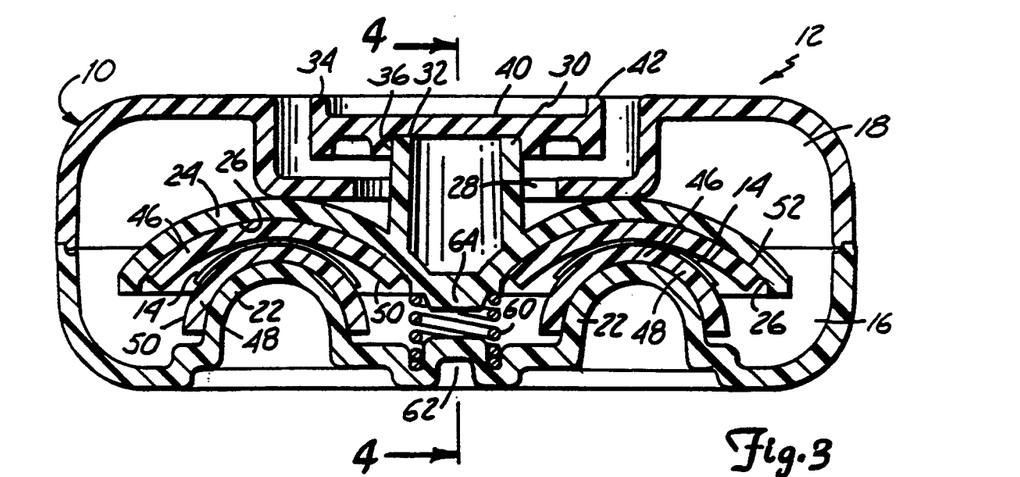
FIG. 3 is an enlarged vertical sectional view taken on the line 3—3 in FIG. 1.
Figure 4:
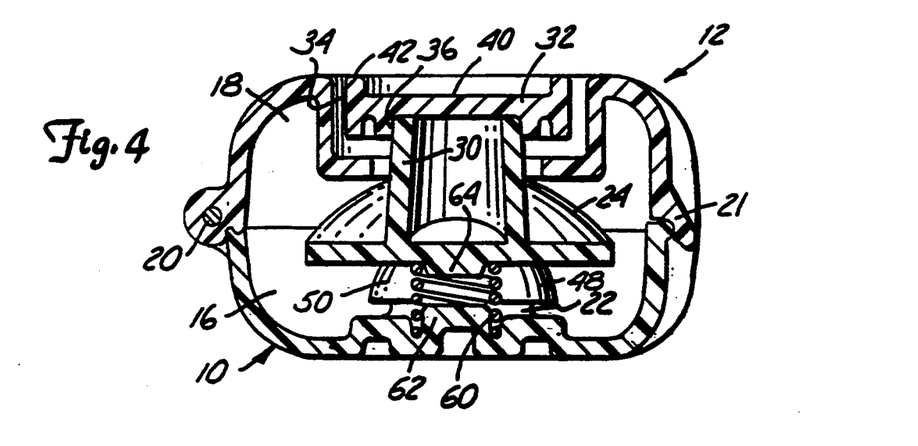
FIG. 4 is a vertical sectional view taken on the line 4—4 in FIG. 3.

As seen in FIGS. 2, 3 and 4, a resilient means such as a compression coil spring 60 is firmly seated and held on a base compression spring boss 62 and extends upwardly within the base 16 when the cover 18 is open, and the upper cleaning pad motion plate 24 is clear of the base. When the cover is closed, moving the upper cleaning pad motion plate 24 down to bring the upper cleaning pad receptacles 26,26 into approximate concentric alignment with the lower cleaning pad receptacles 22,22, a tapered downwardly extending motion plate boss 64 moves inside of the upper end of the coil spring 60 more precisely aligning the cleaning upper pad receptacles 26,26 to be concentric with the lower cleaning pad receptacles 22,22. This spring 60 has the further function of nominally holding the upper cleaning pad motion plate 24 up against the underside of the cover 18 thus insuring that when the cleaning process has been completed, the upper motion plate cleaning pads 46,46 will be spaced from the contact lenses 14,14 so that when the cover 15 is removed, these lenses 14 will remain undisturbed on the center portion of the lower, base mounted cleaning pads 48,48 for easy access to the wearer.

Other resilient means can be used instead of spring 60 within the spirit of the invention and the scope of the claims which follow. For example, a block of sponge rubber or other resilient foam can be fastened either to a motion plate boss or to the center part of the base 16; and it will then become the resilient means.

It is well established in the art that liquid be used in performing the cleaning of contact lenses. These liquids can have several purposes including the control of deleterious matter such as dust, protein build-up, bacteria, fungi, yeast and Acanthamoeba, for example. In addition, in the apparatus and method of the present invention, such liquid will serve as a lubricant to reduce the friction between the cleaning pads and the lenses during the use of the apparatus. With the rapid development of contact lenses and the rapid rise of the use of contact lenses, the use of particular liquids on contact lenses made of particular materials has not been finally established. This invention is not concerned with the character of the liquids used as long as such liquids do not take the apparatus and method outside of the scope of the claims which follow. Such liquids are characterized herein as any "liquid suitable for cleaning contact lenses" or "suitable cleaning liquid."

In order that the contact lenses will not be abraded by the action of the cleaning pads, the pads can be made of any usual or preferred material which will not have an abrading action on the lenses. Also, preferably, at least the portion of the pad adjacent to the cleaning surface will be made of absorbent material 65; and, except for the pad immediately adjacent the handling surface, it is preferred that the entire pad be absorbent.

The apparatus of the invention, then, includes a suitable cleaning liquid 66 which has been injected or otherwise permeated into the absorbent portion 65 of the pads 46, 46, 48 and 48 at least in adjacent relationship to the cleaning surface of the pad. This can be done by dipping the pads in an appropriate cleaning fluid 66, by depositing the fluid or liquid directly on the absorbent portions of the pads immediately before use of the pads, by impregnating each pad at its point of manufacture and then hermetically sealing it so that the liquid will still be in place when the sealed enveloped is opened and the pad is situated in its appropriate cleaning pad receptacle, 22 or 26, or by any other usual or preferred method.

In FIG. 7, the suitable cleaning liquid 66 is indicated to have been impregnated into the absorbent portion of the cleaning pad 48 on the right-hand side of the figure, while the left-hand side of that pad is illustrated as being of absorbent material but not yet impregnated with the fluid 66.

Lens Cleaning Method and Operation

To clean convex/concave contact lenses 14,14, using the form of the invention as shown, the cover 18 of the lens cleaning case 14 is pivoted from the position as seen in FIGS. 1, 3 and 4 to an open position (not specifically shown). This will bring the portion of the cover in adjacent relation to the motion plate movement limiting opening 28 into contact with the underside of the cap 34, and this will cause the motion plate 24 to be raised away from the lower cleaning pad receptacles 22,22 of the base 16.

It is to be understood that the cover 18 could be removed entirely, and then the motion plate 24 lifted clear of the base 16 and of the compression coil spring 60 without departing from the spirit of the invention and the scope of some of the claims which follow.

Had the apparatus been previously used, used upper cleaning pads 46,46 and lower cleaning pads 48,48 would be manually pulled from their respective cleaning pad receptacles and discarded.

Two fresh upper cleaning pads 46,46 will be chosen, and if not already fully impregnated with suitable cleaning liquid 66, these pads will be so impregnated. They will then be installed within the dished upper cleaning pad receptacles 26,26 in any usual or preferred manner which will cause them to stay in position in those receptacles. A preferred manner accomplishing this will be detailed below.

Lower, base mounted cleaning pads 48,48 having been impregnated with suitable cleaning liquid 66, will be prepared for releasable pressure sensitive adhesion to the domed lower cleaning pad receptacles 22,22 by manual removal of the protective skin 58 from the liquid impervious substrate 56 of the handling surface 52 of these cleaning pads 48,48. Each such pad will then be installed on a top central portion of its respective lower cleaning pad receptacle 22, and will thereafter resist relative movement with respect to such lower cleaning pad receptacles until the pads are pulled from the receptacles after they have been used for their intended purpose and are to be discarded.

With all four pads so installed, the cleaning surfaces 50 of the upper pads are in facing relation to the cleaning surfaces 50 of the lower pads, or will be when the cover is closed. First, however, the contact lenses 14,14 to be cleaned are carefully placed on the very top center portions of the cleaning surfaces of the pads 46,46.

Figure 8:
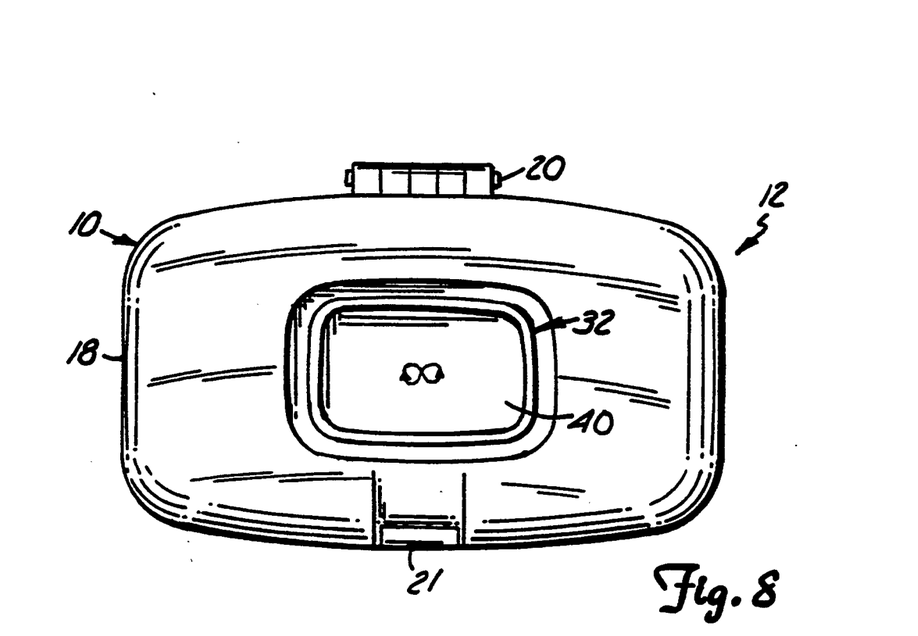
FIG. 8 is a top plan view of the lens cleaning case of the present invention showing a cap portion of a boss or stanchion of an upper cleaning pad motion plate and diagrammatically indicating the relative horizontal movement of this plate with respect to the cover of the lens cleaning case during the process of cleaning concave/convex contact lenses.

In the form of the invention as shown, the cover 18 is now brought back into place to the position as seen in FIG. 1, to position the various elements of the invention and the contact lenses as seen in FIGS. 3 and 4. A pressure and movement means is now used to consummate the cleaning action. This means, in the form of the invention as shown, includes the upper cleaning pads 46,46, the upper cleaning pad motion plate 24 and its upwardly extending boss 30 including its upper cap portion 32. This pressure and movement means is now activated by manually exerted downward pressure on the finger receiving upper surface 40 of the upper cap portion 32 to apply pressure on the lenses 14,14 by pushing the upper pads 46,46 down against the lower pads 48,48. Next the finger applying this pressure is used to move the upper cap portion 32 relatively with respect to the cover 18, thus moving the upper pads 46,46 with respect to the lower pads 48,48. In order to provide a complete cleaning action, and to make sure that the upper pads move in "all directions" with respect to the lower pads, the finger applying the manual pressure and movement can move, carrying the upper surface 40 of the cap 34 of the upper cap portion 32 with it, to prescribe a "FIG. 8" motion as schematically indicated in FIG. 8. The pads 46 and 48 having been positioned firmly in the receptacles 22 and 26, respectively, it is necessary only that the coefficient of friction between the pads and the receptacle exceed the coefficient of friction between the pads and the lenses. It is preferred that the cleaning surfaces 50- of the pads 46 and 48 are of similar or identical materials; and it is expected that the upper and lower surfaces of the contact lenses themselves will have substantially equal coefficients of friction whether in touch with the cleaning surface of the upper pad or the cleaning surface of the lower pad. This being the case, the relative movement of the cleaning surfaces of the upper and lower pads with respect to each other will result in the movement of the upper surface of the contact lens with respect to the lower surface of the upper pad being substantially equal to the movement of the lower surface of the contact lens will have with respect to the upper surface of the lower pad. Thus, after sufficient movement of the upper cleaning pads 46,46, the entire upper and lower surfaces of the contact lenses 14,14 will be properly cleaned. If a uniform figure of eight motion is used, the net movement of each lens away from the center of the lower cleaning pad 48 and the lower cleaning pad receptacle 22, for example, will be negligible.

Since both lenses 14 are being cleaned at the same time and since the liquid 66 is in intimate contact with both surfaces of both lenses, the lenses can be left in the apparatus (possibly with a weight replacing the finger on surface 40 of the cap 34) until any recommended period for exposure to a cleaning or disinfectant liquid 66 being used has expired.

After the lenses have been thoroughly cleaned, the moving finger (or weight) will be withdrawn and the compression coil spring 60, acting on the downwardly extending motion plate boss 64, will cause the motion plate 24 to again move to its central position, and the spring will also cause the motion plate and its upper cleaning pad receptacles 26,26 to carry the upper pads 46,46 away from the contact lenses 14,14.

The cover 18 can now be raised moving the motion plate and its attached upper cleaning pads 46,46 away from the lenses. Using sterile techniques, the now disinfected and cleaned lenses 14,14 can be reinserted into the eyes of the wearer.

Figure 9:
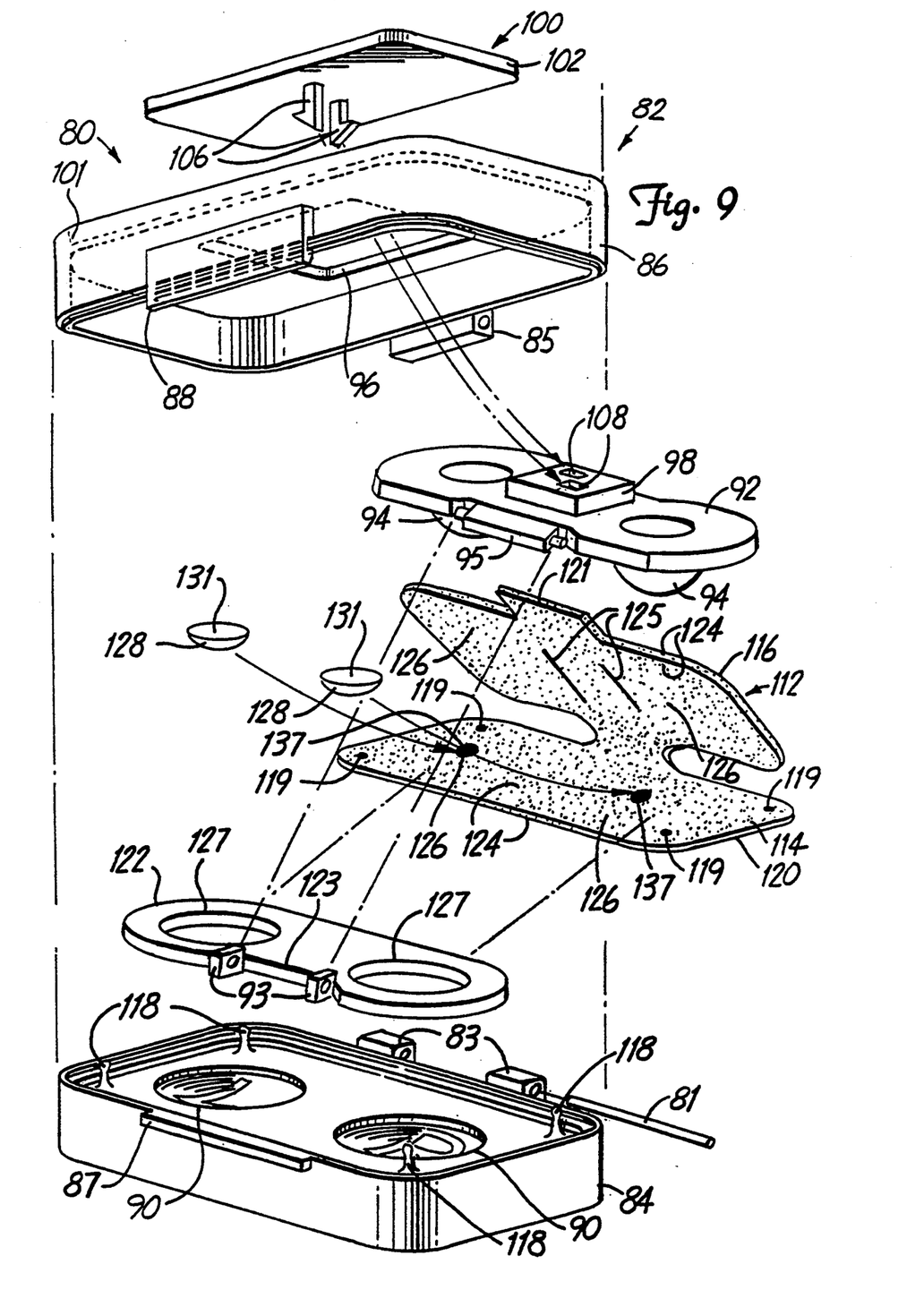
FIG. 9 is an exploded view of a second embodiment for cleaning concave/convex contact lenses made according to the present invention.
Figure 10:
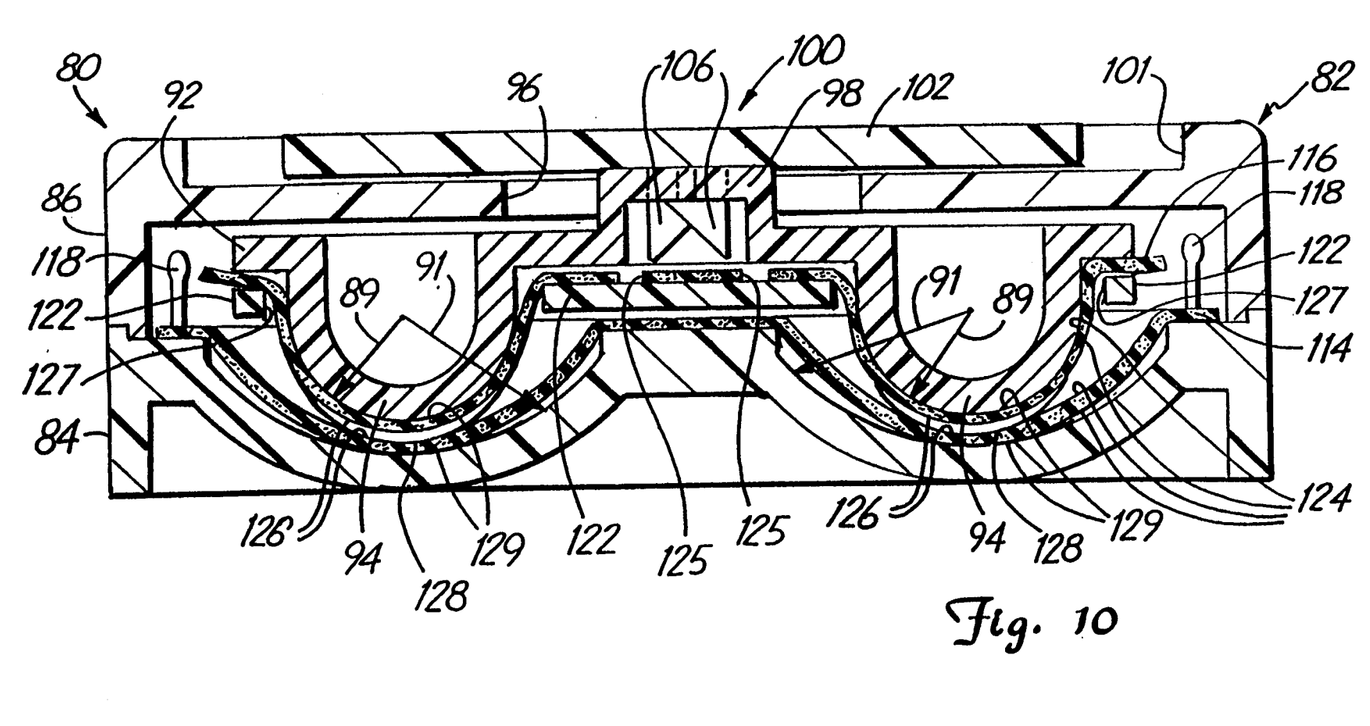
FIG. 10 is a vertical sectional view taken on the line 10—10 in FIG. 9.

A second embodiment of the invention for cleaning concave/convex contact lenses is shown generally in FIGS. 9 and 10 as apparatus 80. Apparatus 80 comprises a case 82 having a base 84 and a cover 86. Cover 86 is pivotally mounted to the base 84 with a hinge assembly comprising a rod 81 inserted into hinge blocks 83 and 85. A resilient latch 88 on cover 86 interlocks with a catch 87 on base 84 to hold cover 86 firmly in a closed position, as illustrated in FIG. 10.

Base 84 is provided with a pair of rounded, concave or dished, lower cleaning pad receptacles 90,90 having left and right indicating marks. Receptacles 90,90 are fixedly positioned in base 84 in a side-by-side coplanar relationship with respect to each other.

Apparatus 80 further comprises an upper cleaning pad motion plate 92. Motion plate 92 includes a pair of rounded, convex or domed, upper cleaning pad receptacles 94,94. Upper cleaning pad receptacles 94,94 form an integral part of motion plate 92 and are in side-by-side coplanar relation to each other to be in approximately concentric relationship with respect to the lower cleaning pad receptacles 90,90 when motion plate 92 is installed inside cover 86.

Outer surfaces of receptacles 94,94 are shaped and sized based on the average human cornea. In the preferred embodiment, an outside radius 89 of the domed outer surfaces is 0.259 inches. The specific size of receptacles 94,94 however does not limit the present invention. Receptacles 94,94 can accommodate both hard and soft contact lenses having a wide range of sizes.

In addition, receptacles 90,90 are sized to accommodate movement of receptacles 94,94. This movement is necessary to effectively clean all surface portions of contact lenses placed therebetween and described below. In the preferred embodiment, the inside radius 91 of receptacles 90,90 is 0.629 inches.

Motion plate 92 includes a centrally positioned upwardly extending stanchion or boss 98. Boss 98 extends through a generally rectangular cleaning pad motion plate movement limiting opening 96 in cover 86 and is secured to an upper portion 100. As with the embodiment shown in FIGS. 1 through 4 and 8, opening 96 includes rounded corners.

In the form of the invention as shown, upper portion 100 is a generally rectangular plate 102. Plate 102 is positioned on cover 86 within a larger rectangular recessed depression 101. A finger receiving upper surface similar to surface 40 shown in FIG. 2 with an upstanding rim around that surface may be included to assist the user in retaining the finger on the plate 102. In the preferred embodiment, plate 102 is secured to boss 98 with catches 106,106 that interlock with corresponding apertures 108,108 in boss 98. It is to be understood, however, that the motion plate 92 need not necessarily be permanently associated with plate 102 in that boss 98 need only be accessible to the person cleaning the lenses through the opening 96 for manual manipulation of motion plate 92.

An upper portion cleaning pad retainer 122 is hinged to motion plate 92 with a hinge assembly comprising hinge blocks 93 and 95. Pad retainer 122 includes a pair of openings 127,127. Openings 127,127 are positioned in a side-by-side coplanar relation to each other and concentrically align with receptacles 94,94. Openings 127,127 each have an inside diameter sufficient to receive the corresponding receptacle 94 and a portion of a cleaning pad 112 to be described below. Cleaning pad 112 includes a lower pad portion 114 and an upper pad portion 116. Lower pad portion 114 is secured to base 84 with spaced apart catches 118 protruding through a plurality of apertures 118 along a perimeter 120 of lower pad portion 114. As best illustrated in FIG. 10, upper pad portion 116 is interposed between a lower surface of motion plate 92 and an upper surface of pad retainer 122. Pad retainer 122 stretches upper pad portion 116 over receptacles 94,94 such that the domed outer surfaces are covered. Although cleaning pad 112 is made from a flexible material which could stretch over receptacles 94,94, slots 125 are cut through a center portion of upper pad portion 116. The presence of slots 125 can help insure that the pad will easily conform to the outer surface of receptacles 94,94. An aligning tab 121 formed on upper pad portion 116 and a corresponding aligning groove 123, adjacent hinge blocks 93 on 122, enable the user to easily align upper pad portion 116 next to receptacles 94,94.

Cleaning pad 112 comprises opposed, spaced-apart, roughly parallel, working surfaces 124. A first of these working surfaces of each portion of pad 112 is a cleaning surface 126 and a second of the surfaces is a handling surface 127. The cleaning surfaces 126 of upper pad portion 116 are on the bottom surface portions covering receptacles 94,94, and the cleaning surfaces 126 of the lower pad portion 114 are on the top surface portions where lenses 128,128 are positioned. When upper pad portion 116 is folded over onto the lower pad portion 114 with concave/convex lenses 128,128 positioned therebetween and receptacles 94,94 protruding through openings 127 in support member 122, as shown in FIG. 10, the cleaning surfaces 126 will be in facing relationship to each other.

The handling surfaces 129 are on sides of pad 112 opposite each of the cleaning surfaces 126. In other words, handling surfaces 129 on upper pad portion 116 contact adjacent receptacles 94,94 on motion plate 92, while handling surfaces 129 on lower pad portion 114 contact portions of receptacles 90,90.

In order that contact lenses 128 will not be abraded by the action of the cleaning pad 112, pad 112 can be made of any usual or preferred material which will not have an abrading action on lenses 128. Also, preferably, at least a portion of pad 112 adjacent to the cleaning surface will be made of a material that is absorbent to any desired cleaning or disinfecting fluid at least in adjacent relationship to the cleaning surfaces 126 of pad 112. This can be done by dipping pad 112 in an appropriate cleaning fluid or liquid, by depositing the liquid directly on the absorbent portions of pad 112 immediately before use of the pad 112, by impregnating pad 112 at its point of manufacture and then hermetically sealing it so that the liquid will still be in place when the sealed envelope is opened and pad 112 is situated on base 84, or by any other usual or preferred method.

Lens Cleaning Method and Operation

To clean convex/concave contact lenses 128,128 using the second embodiment of the invention as shown in FIGS. 9 and 10, the cover 86 of the lens cleaning case 82 is pivoted to an open position. It is to be understood that the cover 86 could be removed entirely, and then the motion plate 92 lifted clear of the base 84 without departing from the spirit of the invention the scope of some of the claims which follow.

Had apparatus 80 been previously used, used cleaning pad 112 would be manually pulled from the plurality of catches 118 on base 84 and unclamped from receptacles 94,94 by rotating pad retainer 122 away from motion plate 92. The used cleaning pad would be discarded and a fresh cleaning pad 112 would then be chosen. The user would then align aligning tab 121 within groove 123 and subsequently rotate pad retainer 122 to stretch upper pad portion 116 over receptacles 94,94. The friction between stretched upper pad portion 116 with receptacles 94,94 and inner side walls of openings 127,127 is sufficient to maintain pad retainer 122 in this generally closed position; however, a suitable fastener could be included if desired. Lower pad portion 114 is then installed on the plurality of catches 118.

With pad 112 so installed, cleaning surfaces 126 of pad portion 114 are in facing relation to the cleaning surfaces 126 of lower pad portion 114, or will be when cover 86 is closed. If not already impregnated with suitable cleaning liquid, each of the cleaning surfaces 126 on upper and lower pad portions 114 and 116 are sufficiently wetted. The contact lenses 128,128 to be cleaned are then carefully placed on the upper surface 138 of pad portion 116 and in the preferred embodiment, each well 131 of contact lenses 128,128 are filled with cleaning solution.

Suitable indicator marks 137, such as dye spots or preformed depressions in lower pad portion 114, can be provided so that the user can easily position the lenses 128 on lower portion 114. Of course, if dye spots are used, a suitable dye that is insoluble to the cleaning fluid would be required.

Cover 86 is now brought back into the closed position to dispose the various elements of the invention and the contact lenses as shown in FIG. 10. A pressure and movement means is then used to consummate the cleaning action. This pressure and movement means includes the upper pad portion 116, the upper cleaning pad motion plate 92 and its upwardly extending boss 98 and in the preferred embodiment, plate 102. The pressure and movement means is activated by manually exerting downward pressure on plate 102 to apply pressure on lenses 128,128 by pushing the upper pad portion 116 down against lower pad portion 114.

Case 82, specifically the closure of cover 86 on base 84, limits the maximum pressure that can be exerted on lenses 128,128. In the preferred embodiment, the maximum pressure is approximately three ounces of force.

Next the finger applying pressure is used to move plate 102 relatively with respect to cover 86, thus moving the upper pad portion 116 with respect to the lower pad portion 114. As with the first embodiment shown in FIG. 8, and in order to make sure that the upper pad portion 116 moves in "all directions" width respect to lower pad portion 114 so that a complete cleaning action is provided, the finger applying the manual pressure and movement can move to prescribe a "FIG. 8" motion. With pad portions 114 and 116 having been positioned on receptacles 90 and 94, respectively, it is necessary only that the coefficient of friction between the pads and the receptacle exceed the coefficient of friction between the pads and the lenses. It is preferred that cleaning surfaces 126 of pad portions 114 and 116 are made from similar or identical materials. In addition, it is expected that the upper and lower surfaces of contact lenses 128,128 themselves will have substantially equal coefficients of friction whether in touch with the cleaning surface of upper pad portion 116 or lower pad portion 114. This being the case, the relative movement of the cleaning surfaces of the upper and lower pad portions with respect to each other will result in the movement of the upper surface of contact lenses 128,128 with respect to the lower surface of upper pad portion 116 being substantially equal to the movement of the lower surfaces of the contact lenses 128,128 with respect to the upper surface of lower pad portion 114.

After sufficient movement of motion plate 102, the entire upper and lower surfaces of contact lens 128,128 will be properly cleaned. If a uniform figure of 8 motion is used, the net movement of each lens away from the center of lower pad portion 114 and lower receptacle 90, for example, will be negligible. Since both lenses 128,128 are being cleaned at the same time and since the cleaning liquid is in intimate contact with both surfaces of both lenses, the lenses can be left in apparatus 80 until any recommended period for exposure to a cleaning or disinfectant liquid being used has expired.

After lenses 128,128 have been thoroughly cleaned, the moving finger will be withdrawn. Cover 86 can now be raised moving motion plate 92 upward and away from lenses 128,128. Using sterile techniques, the now disinfected and cleaned lenses 128,128 can be reinserted in to the eyes of the wearer.

The method of use of the apparatuses of the present invention have been explained in terms of the apparatuses shown herein. It is to be understood, however, that many other forms of apparatuses can be utilized to perform the method of the invention. For example, and very specifically, by having upper pads with upper handling surfaces covered with releasable pressure sensitive adhesive and with the lower handling surfaces of the lower cleaning pads also covered with such releasable pressure sensitive adhesive, one lower pad can be placed on the left thumb of a user, a lens to be cleaned can be placed in the center of the cleaning surface 50 of the lower pad, the center of an upper pad 46 adhered to the index finger of the left hand, and the concave upper pad brought down on the concave/convex compact lens and on the convex lower pad. The thumb and index finger can then be moved with respect to each other, and the contact lens will be cleaned using the method of the invention and without any possibility of deleterious substances on the hands of the operator causing any difficulties in disinfecting, neutralizing or cleaning the lens. When the cleaning action is completed, the index finger will be lifted away from the thumb, and the cleaned lens will be ready to be reinserted into the eye of the wearer.

This use of the thumb and finger of one hand as an essential part of the pressure and movement means of the present invention presents a method which is covered by the present invention.

The invention herein is described and illustrated with reference to concave/convex contact lenses. The invention is equally applicable to other shapes of lenses (flat lenses, for example) and other plates or discs that require a cleaned surface or surfaces. For example, the present invention is well suited to clean the surfaces of semi-conductor wafers.

Although the present invention has been described with reference to preferred embodiments, workers skilled in the art will recognize that changes may be made in form and detail without departing from the spirit and scope of the invention.

What is claimed is:

1. Apparatus for cleaning concave/convex contact lenses including:
    (a) a pair of cleaning pads for each lens to be cleaned, each pad being partially defined by a pair of opposed, spaced-apart, roughly parallel, working surfaces, a first of such surfaces being a cleaning surface and a second of such surfaces being a handling surface, each pad being so constituted and constructed that its cleaning surface readily conforms to and comes into intimate contact with one of the concave and convex surfaces of a contact lens to be cleaned when the pads are positioned with their cleaning surfaces in facing relation to each other with the lens to be cleaned therebetween and when pressure toward the lens is applied to the opposed handling surfaces of the pads;
    (b) wherein pressure and movement applying means is provided to apply such pressure to the pads toward the lens and to apply relative lateral movement to the handling surfaces of the pads to tend to move the pads laterally with respect to each other when said lens to be cleaned is so positioned between the pads;
    (c) wherein cleaning surface portions of both pads are of materials which will not tend to abrade the lens being cleaned, and wherein the handling surface portions each have a coefficient of friction with respect to that part of the pressure and moving means in contact with that handling surface portion compared to the coefficient of friction between the pad cleaning surfaces and the lens such that movement of the pads laterally with respect to each other will result primarily in movement of the cleaning surfaces of the pads over the concave and convex surfaces of the lens when the lens to be cleaned is so positioned.

2. The apparatus of claim 1 wherein:
    (d) at least portions of the pads adjacent the cleaning surfaces are liquid absorbent.

3. The apparatus of claim 1 wherein:
    (d) that portion of the handling surface of at least one of the pads which comes into contact with a portion of the pressure and movement applying means is covered with a releasable pressure sensitive adhesive to tend to prevent relative movement between said pad and said movement means.

4. The apparatus of claim 1 wherein:
    (d) said pressure and movement applying means includes:
        (1) a lens cleaning case having a base and a cover removably secured to said base, said cover being provided with a pad motion plate movement limiting opening through a top portion thereof,
        (2) at least one rounded pad receptacle fixedly positioned in said base and adapted to receive the handling surface of a first of said pair of cleaning pads;
        (3) a cleaning pad motion plate adapted to be positioned inside of said cover, said motion plate including an integral boss adapted to extend upwardly through, and in spaced relation to the periphery of, said movement limiting opening when said cover is secured to the base, said motion plate being provided with at least one rounded pad receptacle adapted to receive the handling surface of a second one of said pair of cleaning pads, said motion plate pad receptacle being situated to lie in approximately concentric relation to said base pad receptacle;
    (e) one of said pad receptacles is domed and the other is dished; and
    (f) said motion plate boss is provided with a cap portion accessible through the cover opening for manual manipulation to press said motion plate receptacle toward said base pad receptacle laterally with respect to said base pad receptacle when said lens is in place between said pads.

5. The apparatus of claim 4 and:
    (g) resilient means between said base and said motion plate nominally urging said motion plate pad to lie in spaced relation to said base mounted pad and said motion plate to lie in contact with the underside of said cover.

6. The apparatus of claim 5 wherein:
(h) said resilient means includes a compression coil spring exerting force between said base and said motion plate.

7. The apparatus of claim 4 wherein:
(g) at least portions of the pads adjacent the cleaning surfaces are liquid absorbent; and
(h) a liquid suitable for cleaning contact lenses is present in and has been absorbed by each of said pads.

8. The apparatus of claim 7 wherein:
(i) two rounded pad receptacles are fixedly positioned in said base in side by side coplanar relation to each other; and
(j) said motion plate is provided with two rounded pad receptacles, each lying in approximately concentric relation to one of said base pad receptacles.

9. The apparatus of claim 4 wherein:
(i) two rounded pad receptacles are fixedly positioned in said base in side by side coplanar relation to each other; and
(j) said motion plate is provided with two rounded pad receptacles, each lying in approximately concentric relation to one of said base pad receptacles.

10. Apparatus for cleaning lenses including:
(a) a pair of cleaning pads for each lens to be cleaned, each pad being partially defined by a pair of opposed, spaced-apart, roughly parallel, working surfaces, a first of such surfaces being a cleaning surface and a second of such surfaces being a handling surface, each pad being so constituted and constructed that its cleaning surface readily conforms to and comes into intimate contact with one of the opposed surfaces of a contact lens to be cleaned when the pads are positioned with their cleaning surfaces in facing relation to each other with the lens to be cleaned therebetween and when pressure toward the lens is applied to the opposed handling surfaces of the pads;
(b) wherein pressure and movement applying means is provided to apply such pressure to the pads toward the lens and to apply relative lateral movement to the handling surfaces of the pads to tend to move the pads laterally with respect to each other when said lens to be cleaned is so positioned between the pads;
(c) wherein cleaning surface portions of both pads are of materials which will not tend to abrade the lens being cleaned, and wherein the handling surface portions each have a coefficient of friction with respect to that part of the pressure and moving means in contact with that handling surface portion compared to the coefficient of friction between the pad cleaning surfaces and the lens such that movement of the pads laterally with respect to each other will result primarily in movement of the cleaning surfaces of the pads over the opposed surfaces of the lens when the lens to be cleaned is so positioned.

* * * * *